3,775,444
4-AMINO, 3- OR 3'-FLUORO-4'-UREIDO
DIPHENYL SULFONES
Norman P. Jensen, Watchung, and Janos Kollonitsch and Tsung-Ying Shen, Westfield, N.J., assignors to Merck & Co., Inc., Rahway, N.J.
No Drawing. Filed July 13, 1971, Ser. No. 162,306
Int. Cl. C07c 147/00
U.S. Cl. 260—397.6                2 Claims

ABSTRACT OF THE DISCLOSURE

4 - amino - 3' - fluoro-4'-ureido diphenyl sulfone or 4-amino - 3-fluoro-4'-ureido diphenyl sulfone is provided having anti-Marek's disease activity.

In summary, this invention provides two novel isomeric chemical compounds, 4-amino-3'-fluoro-4'-ureido diphenyl sulfone or 4-amino-3-fluoro-4'-ureido diphenyl sulfone having the following formula:

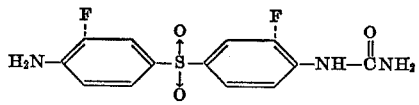

The dotted line indicates that fluorine is present in only one ring.

The compound is useful in the treatment and prophylaxis of Marek's disease to prevent poultry death and sickness as well as to decrease the incidence of lymphoproliferative foci and associated inflammatory-like lesions. It also serves as a growth promotant by decreasing subclinical disease. Poultry feed compositions are provided which contain the 4-amino-3- or 3'-fluoro-4'-ureido diphenyl sulfone in low concentrations, but which are active against the disease. In addition, soluble salts of 4-amino-3- or 3'-fluoro-4'-ureido diphenyl sulfonate are provided which can be dissolved in the drinking water for ease of treatment of the poultry. A feed supplement premix is also provided containing the active compounds, 4-amino-3- or 3'-fluoro-4'-ureido diphenyl sulfone are provided Marek's disease is a highly infectious lymphoproliferative disorder of poultry, especially chickens. Marek's disease has also been known as neural leukosis. The causative agent(s) are viral with a DNA-type virus implicated as an etiological factor. Marek's disease often is clinically evident in birds prior to sexual maturity, i.e., before the first egg is laid. Clinical manifestations may be one or more of these signs: regional or generalized paralysis, diarrhea with fecal staining of posterior abdominal feathers, weight loss, dyspnea, blindness, enlarged abdomen, or death.

The lesions evident are one or more of the following: lymphocytic infiltrated peripheral nerves and/or feather follicles, lymphoproliferative lesions, microscopic to several mm. in size, within any tissue of the body but principally within the liver, spleen, kidney, gonads, heart, proventriculus, breast muscle, skin, and nerves.

Marek's disease is estimated by the U.S. Department of Agriculture to cause a $200 million annual loss to the U.S. poultry industry. This loss is due to mortality and morbidity and to the rejection of slaughtered bird carcasses as being unfit for human consumption. This rejection is due to the presence of the lymphoproliferative foci.

The compounds of this invention, 4-amino-3- or 3'-fluoro-4'-ureido diphenyl sulfone also serve as a growth promotant for poultry when administered at the disclosed dosage levels.

In accordance with this invention, the 4-amino-3- or 3'-fluoro-4'-ureido diphenyl sulfone is employed for controlling Marek's disease by oral administration to poultry susceptible to the disease, either in the drinking water or feed.

It is preferred to disperse the diphenyl sulfones in the finished feed of the animals, and to administer the medicated feed ad libitum to the birds. Good results against Marek's disease are achieved with feedstuff containing from about 0.0002% to 0.1% by weight of the 4-amino-3- or 3'-fluoro-4'-ureido diphenyl sulfone. Drug levels can also operably be from 0.00005% to 0.2% in the feed. The preferred range is between 0.001 and 0.01% in the feed. Levels in poultry feed are here expressed in terms of percent by weight concentration.

The higher levels may be used in treating an established outbreak of Marek's disease, but the higher dosages are not preferred for prophylactic treatment where medicated feed is given continuously to the poultry. It will be appreciated by those skilled in this art that the lowest levels consonant with adequate control of Marek's disease will be used in most instances in order to eliminate as far as possible any side effects that might be induced on prolonged feeding of unnecessarily high levels. The finished feed in which the above-described levels of 4-amino-3- or 3' - fluoro-4'-ureido diphenyl sulfone are employed is a nutritionally adequate one containing sources of carbohydrate, protein, fat, vitamins, minerals and other nutritional factors commonly employed in commercial poultry raising. In addition, other poultry feed additives such as coccidiostats, e.g., amprolium, ethopabate, nicarbazin, can be employed in the compositions. The feeds can also contain additives which potentiate or attenuate the action of the 4-amino-3- or 3'-fluoro-4'-ureido diphenyl sulfone so that lower or higher levels can be used in the feed.

In addition to administration via the solid feedstuff, the compounds of the invention may be administered to poultry by incorporation in the drinking water. The preferred dose levels in the drinking water are usually somewhat less than those employed in a solid feed inasmuch as poultry drink about twice as much as they eat. The operable level in drinking water is from 0.00001% to 0.1% by weight of 4-amino-3- or 3'-fluoro-4'-ureido diphenyl sulfone, the preferred range is 0.0002% to 0.1% by weight. Administration via the drinking water is of advantage when using the compound therapeutically rather than prophylactically. For this purpose it is convenient to prepare dispersible or water-soluble powders in which the 4-amino-3- or 3'-fluoro-4'-ureido diphenyl sulfone is intimately dispersed in a suitable water-soluble or dispersible liquid or solid carrier such as dextrose, sucrose, DMSO, or other suitable non-toxic carriers, at concentrations of from about 0.03% to about 25% by weight. These solids may then be conveniently added to the drinking water by the poultry grower.

A typical drinking water formulation contains 4-amino-3- or 3'-fluoro-4'-ureido diphenyl sulfone, 0.3%; 1-(2-n-propyl-4-amino-5-pyrimidinylmethyl) - 2 - methyl pyridinium chloride hydrochloride, 9.6%; dextrose, 30%; propylene glycol, 20%; dimethylpolysiloxane, 0.002%; polyoxyethylene sorbitan monooleate, 0.2%; water, to 100%.

According to a further aspect of this invention, there are provided compositions comprising poultry feed supplements or additives containing the 4-amino-3- or 3'-fluoro-4'-ureido diphenyl sulfone previously described as an effective Marek's disease agent. In such compositions the compounds are mixed with or dispersed in an orally ingestible carrier vehicle that is non-toxic to the poultry and compatible with the finished feedstuff. These feed supplements contain a significantly higher percentage of 4-amino-3- or 3'-fluoro-4'-ureido diphenyl sulfone than does the finished feed, and are mixed with or blended into the feedstuff before administration to the poultry. In order to assure uniform distribution of the compound in the finished feed, it is customary to employ an intermediate dilution step in which the supplement is blended with a portion of the final feed, and this "intermediate mix" is then added to the remainder of the feed with adequate mixing. The diphenyl sulfone described hereinabove may be formulated into feed supplement compositions containing from about 0.05% to about 50% by weight of drug. It is preferred in the industry to use from about 1–5 pounds of such a supplement per ton of feedstuff. It will, therefore, be appreciated that the preferred supplement concentration will depend to a large extent on the final use level desired. With the compounds of this invention, feed supplement compositions containing from about 1.0% to about 20% by weight of active ingredient are preferred.

Diluent or carrier vehicles that may be used in these poultry feed supplements are solid orally ingestible poultry feed additives such as corn meal, distillers' dried grains, ground oyster shell, citrus meal fermentation residues, wheat shorts, wheat middlings, molasses solubles, corn gluten feed, soybean meal, dehulled soya flour, crushed limestone, fermentation mycelia, edible vegetable substances and the like. Nutritive carriers are preferred since the finished feed is benefitted thereby.

Examples of typical feed supplements containing the compound of the present invention are (A)

|  | Lbs. |
|---|---|
| 4-amino-3'-fluoro-4'-ureido diphenyl sulfone | 1.5 |
| Amprolium | 25.0 |
| Wheat middlings | 73.5 |

(B)

| 4-amino-3-fluoro-4'-ureido diphenyl sulfone | 5.0 |
|---|---|
| Corn gluten feed | 95.0 |

(C)

| 4-amino-3'-fluoro-4'-ureido diphenyl sulfone | 2.0 |
|---|---|
| Corn germ meal | 40.0 |
| Corn distillers' grains | 58.0 |

(D)

| 4-amino-3-fluoro-4'-ureido diphenyl sulfone | 1.0 |
|---|---|
| Corn distillers' dried grains | 99.0 |

(E)

| 2,4-diamino-5-(p-chlorophenyl) - 6 - ethyl pyrimidine | 0.5 |
|---|---|
| 4-amino-3'-fluoro-4'-ureido diphenyl sulfone | 2.0 |
| Distillers' dried grains | 97.5 |

The compounds, 4-amino-3- or 3'-fluoro-4'-ureido diphenyl sulfone, used in this invention can be prepared using the following procedures. The starting material is 4-nitro-4'-acetamido diphenyl sulfone. The starting material is photofluorinated by treatment with fluoroxyperfluoroalkanes or fluoroxypentafluorosulfur under the influence of a free radical initiator. Ultraviolet irradiation is one preferred means of initiating free radicals. This photofluorination reaction process does not form part of this invention but is an invention of Dr. Janos Kollonitsch and is claimed in a copending application, U.S. Ser. No. 60,645 filed Aug. 3, 1970. The fluorine is substituted into the ring having the acetamido substituent, and is present in the reaction product as both the 2'- and the 3'-monofluoro isomers.

After separation of the photofluorination products using thin layer chromatography, the acetamido group is hydrolyzed to the amino group. Acid hydrolysis is preferred, and a strong mineral acid such as hydrochloric or sulfuric acid can be used. The hydrolysis is conducted at an elevated temperature, from 60° C. to the reflux temperature of the solvent. The preferred solvent is water, although any solvent for both the starting material and the acid can be used.

At this stage in the reaction synthesis, there is a divergence in method which is necessary to independently prepare the 3-fluoro isomer. The reaction scheme first described yields the 3'-fluoro isomer. The 4-nitro-3'-fluoro-4'-amino diphenyl sulfone is then treated with phosgene $(COCl_2)$. An excess of the reagent is employed, and the two compounds are reacted in a solution of a solvent such as dioxane or dimethyl sulfoxide. An intermediate product is obtained which is 4-nitro-3'-fluoro-4'-isocyanato diphenyl sulfone.

The latter compound is then reacted, preferably in situ, with an ammoniating reagent such as ammonia. The reaction preferably takes place in a solvent such as dioxane or dimethylsulfoxide. An excess of the chosen ammoniating agent is added to the solution. The product obtained is 4-nitro-3'-fluoro-4'-ureido diphenyl sulfone.

This latter compound is then reduced using hydrogen and a Raney nickel or other suitable catalyst to yield the desired 4-amino-3'-fluoro-4'-ureido diphenyl sulfone. This can then be formed into soluble salts such as the hydrochloride or nitrate by acidifying in solution and recovering the precipitated solid salt.

The following method is used to prepare the 4-amino-3-fluoro-4'-ureido diphenyl sulfone. The 4-nitro-3'-fluoro-4'-amino diphenyl sulfone is treated with a blocking agent such as trifluoroacetic anhydride, to prepare the 4'-trifluoroacetamido derivative. This latter is then catalytically reduced using hydrogen and a suitable catalyst, such as Raney nickel, to the 4-amino-3'-fluoro-4'-trifluoroacetamido diphenylsulfone.

The latter compound is then treated with phosgene, followed by ammoniation, to prepare 4'-ureido-3-fluoro-4-trifluoroacetamido diphenylsulfone. The blocking group is then removed in methanolic sodium hydroxide to yield the desired compound, 4-amino-3-fluoro-4'-ureidodiphenylsulfone.

This invention is further illustrated by the following examples.

EXAMPLE 1

4-nitro-3'-fluoro-4'-acetamido-diphenyl sulfone 4-nitro-4'-acetamido-diphenyl sulfone (4.0 g.) is dissolved in 32 ml. of trifluoroacetic acid, cooled to —12° C., then under stirring and ultraviolet irradiation 2.1 g. of fluoroxytrifluoromethane is introduced over about one hour. Irradiation is continued for another two hours. Another 1 g. of fluoroxytrifluoromethane is added over about one hour, followed by an irradiation period of 2½ hours. The temperature is kept between —10° C. and 0° C.

The residue obtained after evaporation of trifluoroacetic acid in vacuo is treated with water and sodium bicarbonate solution, washed with water, and dried in vacuo to give 3.5 g. of crystalline product which is recrystalized from methanol to give a pure crystalline product, M.P. 232–233° C., identified as 4-nitro-3'-fluoro-4'-acetamido-diphenyl sulfone. The product weighs 2.75 g.

4-nitro-3'-fluoro-4'-amino-diphenyl sulfone 2.75 g. of the compound 4-nitro-3'-fluoro-4'-acetamido-diphenyl sulfone is placed in 25 ml. of 6 N HCl and refluxed for two hours. Upon cooling, the hydrochloride salt precipitates. The mixture is diluted with water and brought to pH=10 using sodium hydroxide solution. The precipitate is collected and washed with water to give 2.2 g. of product, 4-nitro-3'-fluoro-4'-amino-diphenyl sulfone, M.P. 150–153° C. The product is used directly in the next step without further characterization.

4-nitro-3'-fluoro-4'-ureido diphenyl sulfone 2.2 g. of 4-nitro-3'-fluoro-4'-amino diphenyl sulfone is dissolved in 50 ml. p-dioxane and slowly added to 120 ml. of p-dioxane containing a molecular excess of phosgene. When addition is complete, stirring is continued for one hour. The mixture is then concentrated to near dryness. An additional 100 ml. of p-dioxane is then added, and gaseous NH₃ bubbled in for 10 minutes. After stirring for an additional 15–20 minutes, the solid is collected, washed with water and then ether. After recrystallization from 1:1 water:dimethyl formamide, 2.1 g. of material is obtained which is identified using NMR as the desired product, 4-nitro-3'-fluoro-4'-ureido diphenyl sulfone. The product is used without further characterization in the next step.

4-amino-3'-fluoro-4'-ureido diphenyl sulfone 2.3 g. of 4-nitro-3'-fluoro-4'-ureido diphenyl sulfone is dissolved in 50 ml. of ethyl alcohol. A small amount of Raney nickel catalyst is added. The mixture is hydrogenated at 40 p.s.i. until hydrogen uptake reaches the theoretical uptake. The mixture is then filtered, and the filtrate concentrated to dryness. The residue is triturated with ether and then recrystallized using ether and a small amount of methanol. This material is then recrystallized from methanol and then from tetrahydrofuran to give 430 mg. of 4-amino-3'-fluoro-4'-ureido diphenyl sulfone as a tetrahydrofuran solvate which decomposes at about 118° C. Calculated and observed values for C, H, and N agree.

EXAMPLE 2

4'-trifluoroacetamido-3'-fluoro-4-nitro diphenyl sulfone 2.96 g. of 4'-amino-3'-fluoro-4-nitro diphenyl sulfone is dissolved in 10 ml. of trifluoroacetic anhydride, refluxed for 1 hour (well protected from moisture), evaporated to dryness, in vacuo to obtain a product, consisting of substantially pure 4'-trifluoroacetamido-3'-fluoro-4-nitro diphenyl sulfone.

4'-trifluoroacetamido-3'-fluoro-4-amino diphenyl sulfone 3.92 g. of 4'-trifluoroacetamido-3'-fluoro-4-amino diphenyl sulfone is dissolved in 120 ml. of methanol, 0.5 g. of Raney nickel catalyst is added and the mixture is hydrogenated at about 40 p.s.i. pressure in a Parr-type of hydrogenator for 2 hours, that is until the hydrogen consumption approaches the theoretical (3 moles of H₂ per mole of starting material). The solution obtained after filtration of the catalyst is evaporated in vacuo, to give 4'-trifluoroacetamido-3-fluoro-4-amino diphenyl sulfone, which is purified by recrystallization from benzene.

4-trifluoroacetamido-3-fluoro-4'-ureido diphenyl sulfone 3.62 g. of 4'-trifluoroacetamido-3'-fluoro-4-amino diphenyl sulfone dissolved in 100 ml. of dry dioxane is added dropwise in about 30 min. to a solution of 6 g. of phosgene in 80 ml. of dioxane. After 2 hours standing at room temperature the mixture is concentrated in vacuo to dryness, re-dissolved in 120 ml. of dioxane and NH₃ gas is bubbled in for about 20 minutes. After 30 min. of further stirring at room temperature, the reaction mixture is evaporated in vacuo to dryness. The product 4-trifluoroacetamido-3-fluoro-4'-ureido diphenyl sulfone is isolated by thin-layer chromatography.

4-amino-3-fluoro-4'-ureido diphenyl sulfone 2.02 g. of 4-trifluoroacetamido-3-fluoro-4'-ureido diphenyl sulfone is dissolved in 120 ml. of methanol, then a solution of 0.22 g. of NaOH in 20 ml. of methanol is added drop-wise. The reaction mixture is stirred for 1 hour more and evaporated to dryness in vacuo. The residue is distributed between ethyl acetate and water, the organic layer is dried over MgSO₄ and evaporated to dryness. The crude product, 4-amino-3-fluoro-4'-ureido diphenyl sulfone thus obtained is purified by thin-layer chromatography and characterized by spectroscopy and elementary analysis.

What we claim is:

1. A compound of the formula

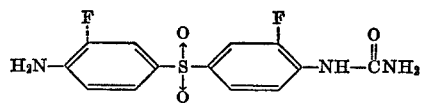

the dotted line indicating that fluorine is present in only one ring.

2. A compound

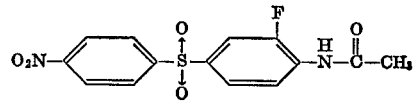

References Cited

Mader, P. M., J. Amer. Chem. Soc., vol. 87, pp. 3191–2.

Migrdichian, V., Organic Synthesis, vol. II, p. 1427.

HENRY R. JILES, Primary Examiner

M. A. M. CROWDER, Assistant Examiner

U.S. Cl. X.R.

260—553 A, 562 R